United States Patent [19]

Hoffacker et al.

[11] 4,218,090
[45] Aug. 19, 1980

[54] BICYCLE SEAT

[76] Inventors: Neal D. Hoffacker, 920 Hamilton Ave., Palo Alto, Calif. 94301; Bernhard J. Hoffacker, 104 Alta Mesa, Woodside, Calif. 94062

[21] Appl. No.: 878,531

[22] Filed: Feb. 16, 1978

[51] Int. Cl.² ............................................. B62J 1/18
[52] U.S. Cl. .................................... 297/214; 297/195; 297/202
[58] Field of Search .............. 297/195, 200, 214, 199, 297/202

[56] References Cited

U.S. PATENT DOCUMENTS

| | | | |
|---|---|---|---|
| 571,388 | 11/1896 | Page | 297/202 |
| 572,163 | 12/1896 | Henderson | 297/214 |
| 576,310 | 2/1897 | Henderson | 297/214 |
| 594,316 | 11/1897 | Basch | 297/202 |
| 605,051 | 5/1898 | Christy | 297/202 |
| 3,185,522 | 5/1965 | Faulhaber | 297/214 |
| 3,807,793 | 4/1974 | Jacobs | 297/214 |
| 3,844,611 | 10/1974 | Young | 297/214 |
| 3,997,214 | 12/1976 | Jacobs | 297/214 |
| 4,012,072 | 3/1977 | Hansen | 297/219 |
| 4,026,600 | 5/1977 | Kutaguchi | 297/214 |
| 4,098,537 | 7/1978 | Jacobs | 297/195 |

Primary Examiner—Roy D. Frazier
Assistant Examiner—Peter A. Aschenbrenner
Attorney, Agent, or Firm—Limbach, Limbach & Sutton

[57] ABSTRACT

A new and improved bicycle seat which is suitably designed to allow the cyclist to sit in the seat and obtain immediate and longlasting comfort without being concerned and plagued with saddlesores after long periods on the seat. The seat is further designed to be durable and efficient in addition to being comfortable.

2 Claims, 4 Drawing Figures

U.S. Patent     Aug. 19, 1980     4,218,090
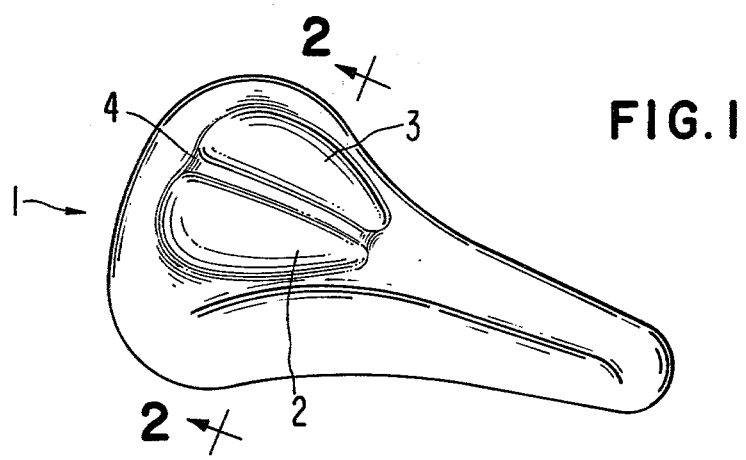
FIG. 1
FIG. 2
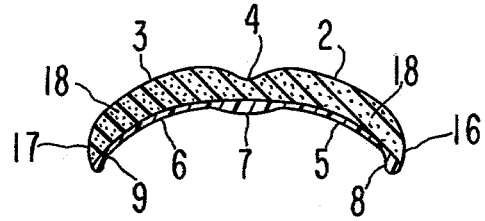
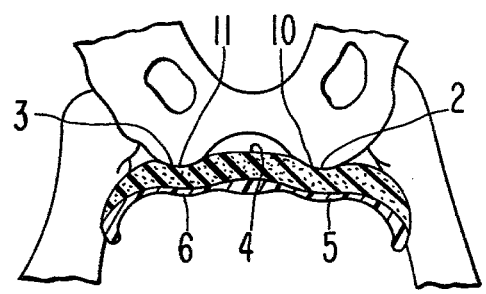
FIG. 4
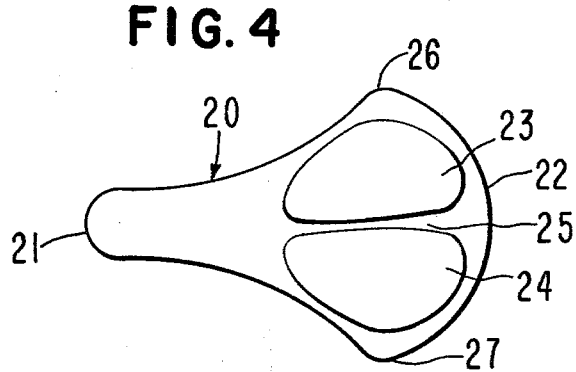
FIG. 3

BICYCLE SEAT

FIELD OF THE INVENTION

The invention relates to a new and improved bicycle seat and more particularly it relates to a bicycle seat which is designed to soften the area of the seat where there is hard contact between the cyclist's pelvic bones and the seat and to evenly distribute the cyclist's weight over as large an area as possible.

DESCRIPTION OF THE PRIOR ART

For many years there has been a variety of saddles or seats available to cyclists. It has long been a concern of both cyclists and manufacturers of cycle seats that these saddles or seats would provide total comfort for the cyclists during long as well as short periods on the seat. Most prior art seats have conformed to the same shape as that of the well known three-speed and ten-speed cycle seats. Different materials have been used over the years including some all leather saddles as well as certain seats made with a rigid shell which is padded with a certain durable material and covered with a leather or synthetic fabric.

Over the years there have been some variations from the standard model for cycle seats using either the all leather cycle seat or the cycle seat made with a shell, padding and cover. For example, one manufacturer has constructed a cycle seat made entirely of a thick, solid leather fabric. This cycle seat has no inner shell, nor padding. The cycle seat is designed with certain areas of the seat being higher than others. These higher areas primarily being provided to make contact with the rider's pelvic bones.

U.S. Pat. No. 3,807,793, issued to Jacobs, discloses a seat pad constructed with five compartments with a foam or other padding injected into two of the compartments and with the remaining compartments being padded with some suitable material. All compartments of the U.S. Pat. No. 3,807,793 pad are covered with a leather or synthetic covering. This seat pad is, in turn, fastened to a conventional style bicycle seat. The necessity of separate compartments in the U.S. Pat. No. 3,807,793 is to prevent oil leakage, and to prevent the foam from moving from one compartment to another and thereby creating an imbalance in the seat padding.

While the prior art cycle seats and pads provided a certain amount of comfort to the rider, no seats and/or pads have been designed to allow the cyclist to sit on a seat and obtain immediate and long lasting comfort for any period of time. This is because none of the prior art cycle seats have been designed to minimize the amount of pressure applied by the seat to the sensitive pelvic region by increasing the area of support and distributing the pressure applied by the seat over a larger and less sensitive area.

STATEMENT OF THE INVENTION

In view of the problems outlined above, it is apparent that there is a need in the art for an improved cycle seat which would soften the hard contact areas between the cyclist's pelvic bones and the cycle seat and to evenly distribute the cyclist's weight over as large an area of the saddle and as evenly as possible. Accordingly, we have discovered that a seat shell having the general appearance of a conventional three or ten-speed bicycle seat constructed with its flat, trailing end having two thin sections located on each side of a thicker center section cushioned with a proper thickness of special padding material and covered with a suitable outer covering will result in a bicycle seat which will provide long hours of comfort to cyclists and which is also aesthetically appealing.

Realizing that the points of greatest contact between the cyclist's pelvic bones and the cycle seat are the two lower protruding parts of the hip bones, i.e. the ischial tuberosity (the sitting bones) and the ischial ramus (if a more prone riding position is used), we set out to construct an anatomical seat which would apply a minimum amount of direct pressure to the bone ends, and instead form around the pelvic bones to offer a greater supporting mass.

We found that neither the saddle's width, nor the nylon shell, nor the padding alone could resolve the anatomical problem. Instead, we found it necessary to construct each differently than presently constructed, and that together they created a system which is anatomically conforming and comfortable.

We further found that based upon the average width of the male and female pelvic structures, a different width is necessary to properly support each sex. Also, we found that a racing cyclist rides in a bent over position, and the casual or touring cyclist rides in a more upright position thus requiring different amounts of support in different areas. It was, therefore, determined that a male who rides most often in an upright or in a half-upright position has a need for more support of the pelvic bone, thus a 6 and ¼ inch wide saddle; and that a female has the need for a 7 inch wide saddle to obtain proper support. Since conventional racing model seats were designed to measure 5 and ⅝ inches in width, it was determined that a wider seat would be needed for the above described riders.

We found that previous nylon shells were stiff, and that when enough weight was applied to make them bend, the bending occured in a bow-like manner not at all related to the human pelvic structure. We have molded a nylon shell which gives in the areas of initial contact thereby increasing the contact area of the cyclist and consequently resulting in a greater area of support. This reduces much of the normal pressure applied to the pelvic bone tips wich is the major cause of saddle discomfort. The thicker areas of the nylon shell maintain proper saddle shape and stiffness. The saddle shell alone will not provide comfort, however when it is combined with the other characteristics of our invention, the combination results in a total comfort saddle.

We further found that in addition to certain padding thickness and density, a specific padding shape is necessary for our system to function. This shape is distinctly different than the standard saddle shape. This shape requires padding bumps where the pelvic bones contact the saddle, and a necessary indentation between the two bumps. These two bumps are located directly over the thinned portions of the nylon shell. As the pressure of the pelvic bones are applied to the two bumps the padding compresses along with the thinned portions of the nylon shell; and the displaced padding fills the indentation between the two bumps. This system will not work without the indentation because otherwise the padding will form an irritating compressed ridge in the midline, and adequate padding displacement caused by the pelvic bones cannot occur.

BRIEF DESCRIPTION OF THE DRAWINGS

The advantages and characteristic features of the subject invention will be in part from the accompanying drawings, and in part pointed out in the following detailed description of the invention in which reference will be made to the accompanying drawings, wherein like reference numerals will designate corresponding parts and wherein:

FIG. 1 is a top plan view of a cycle seat constructed in accordance with the invention;

FIG. 2 is a cross-sectional view along lines 2—2 of FIG. 1;

FIG. 3 illustrates areas of the cyclist's pelvic region making contact with the invention as shown in FIG. 2; and, FIG. 4 is a top plan view of a seat shell constructed in accordance with the invention.

DETAILED DESCRIPTION OF THE PREFERRED EMBODIMENTS

FIG. 1 illustrates a cycle seat 1 constructed in accordance with the invention, having padded portions 2 and 3 elevated above a mid-line groove portion 4.

A cross sectional view of seal 1 is illustrated in FIG. 2 with padded portions 2 and 3 located above shell portions 5 and 6 respectively. Mid-line portion 4 is located above shell portion 7. Shell portions 8 and 9 are located adjacent shell portions 5 and 6, respectively.

FIG. 3 illustrates what happens to a portion of cycle seat 1 when a cyclist makes contact with seat 1. Pelvic bones 10 and 11 are shown in contact with padded portions 2 and 3, respectively. Shell portions 5 and 6 are shown to be displaced from their positions as shown in FIG. 2.

FIG. 4 illustrates a seat shell which is constructed in accordance with the invention. Seat shell 20 is molded out of a plastic material such as nylon with a narrow leading portion 21 and a wide trailing portion 22. Trailing portion 22 further has portions 23 and 24 which correspond to the padded portions 2 and 3 of finished seat 1 in FIG. 1. Portions 23 and 24 are constructed to have a smaller cross-sectional dimension than has center portion 25 of shell 20. This construction enables the nylon shell 20 to have its greatest give in areas 23 and 24 (see areas 5 and 6 of FIGS. 2 and 3) when sitting bones 10 and 11 contact seat 1 (FIG. 3) at padded portions 2 and 3 (corresponding to shell portions 23 and 24 of shell 20). When portions 23 and 24 of shell 20 give in response to the cyclist's weight, the thicker portions 25, 26 and 27 of shell 20 (corresponding to outer seat portions 4, 16 and 17) help to maintain the shape and stiffness of shell 20 thereby also maintaining the shape and stiffness of seat 1.

Shell 20 is provided with a comfortable and durable padding of a specific density as shown by reference numeral 18 in FIG. 2. This padding, which may be of foam, was distributed over the entire top surface of shell 20, including portions 23 and 24. However, to compensate for the problem arising in area 25 when a bulk of padding was pushed into area 25 from both areas 23 and 24 by the cyclist when pressure was applied to areas 23 and 24, which resulted from each sitting bone making contact with the outer seat area corresponding to shell areas 23 and 24 of shell 20 and pushing the padding away in all directions, a lesser amount of padding was distributed over shell area 25 between portions 23 and 24. Therefore, when padding was forced in all directions from portions 23 and 24 when the sitting bones contacted these areas, area 25 would not result in a bundle of padding in the seat area just under the rectum. Area 4 of FIG. 3 (corresponding to area 25 of shell 20) illustrates how any discomfort to the rectum area is eliminated when sitting bones 10 and 11 contact portions 2 and 3 of seat 1.

The invention has been described in detail with particular reference to certain embodiments thereof, but it will be understood that variations and modifications can be effected within the spirit and scope of the invention.

What is claimed is:

1. A bicycle seat of the type having a flexible shell portion including a narrow leading edge portion with a downwardly turned tip, a wider trailing end portion with a centermost portion, a first relatively thinned and flexible pelvic zone lying along one side of said centermost portion for flexibly supporting one portion of the pelvic region of a cyclist, a second relatively thinned and flexible pelvic zone lying along the other side of said centermost portion for flexibly supporting another portion of the cyclist's pelvic region, said seat further has downwardly turned side portions located on each side of said seat adjacent each of said thinned pelvic regions and with said centermost portion of said trailing end and said side portions located along said trailing end each having a larger transverse cross-sectional dimension than each of said thinned pelvic zones, the improvement wherein an amount of padding material is distributed over said flexible shell including each of said thinned pelvic zones, said centermost portion and said downwardly turned side portions, with a larger amount of said padding being distributed over said thinned pelvic zones than is distributed over the remaining portions of said shell to form bumps of padding over each of said thinned pelvic zones such that when a cyclist's pelvic region contacts said bumps over said thinned zones, said padding bumps are depressed as the padding under said bumps is distributed over said thinned zones in a downwardly direction, said padding under said bumps over said thinned zones being further distributed over said centermost and said side portions of said seat to provide for cyclist comfort.

2. The invention according to claim 1 wherein said bicycle seat is covered with an outer covering of material which extends over said flexible shell and said padding material including said bumps of padding over each of said thinned pelvic zones and which conforms to the general shape of said seat.

* * * * *